US008421611B1

(12) United States Patent
Coshow et al.

(10) Patent No.: US 8,421,611 B1
(45) Date of Patent: Apr. 16, 2013

(54) TRAILER AXLE ADJUSTMENT SENSOR AND INDICATION SYSTEM AND METHOD

(76) Inventors: Albert Coshow, Albany, OR (US); Mary Bennett, Bremerton, WA (US)

(*) Notice: Subject to any disclaimer, the term of this patent is extended or adjusted under 35 U.S.C. 154(b) by 326 days.

(21) Appl. No.: 12/938,954

(22) Filed: Nov. 3, 2010

Related U.S. Application Data

(60) Provisional application No. 61/258,179, filed on Nov. 4, 2009.

(51) Int. Cl.
*G08B 21/00* (2006.01)
(52) U.S. Cl.
USPC ...... 340/431; 340/531; 340/539.23; 340/547; 280/407; 280/407.1
(58) Field of Classification Search ............ 340/431, 340/440, 531, 539.1, 539.23, 547, 904; 280/407, 280/407.1, 423.1, 789, 149.2; 701/36, 37
See application file for complete search history.

(56) References Cited

U.S. PATENT DOCUMENTS

| 5,157,838 A | 10/1992 | Sims |
| 5,716,071 A * | 2/1998 | Stanley et al. ............ 280/407.1 |
| 6,587,041 B1 | 7/2003 | Brown, Jr. |
| 6,793,235 B2 | 9/2004 | Maxwell et al. |
| 6,882,907 B2 | 4/2005 | Bure et al. |
| 6,921,100 B2 * | 7/2005 | Mantini et al. ............... 280/407 |
| 7,415,771 B2 | 8/2008 | Harrill |
| 7,619,506 B2 | 11/2009 | Knoll et al. |
| 2008/0191449 A1 | 8/2008 | Standen |

* cited by examiner

*Primary Examiner* — Hung T. Nguyen

(57) ABSTRACT

A portable sensor and indication system and method for sensing the position of a trailer body relative to an axle frame and providing an alert signal to an operator when the locking pins on the trailer body and the holes on the axle frame rails are aligned. Once the alert signal is provided, the locking pins may be engaged to lock the trailer body to the axle frame.

9 Claims, 7 Drawing Sheets

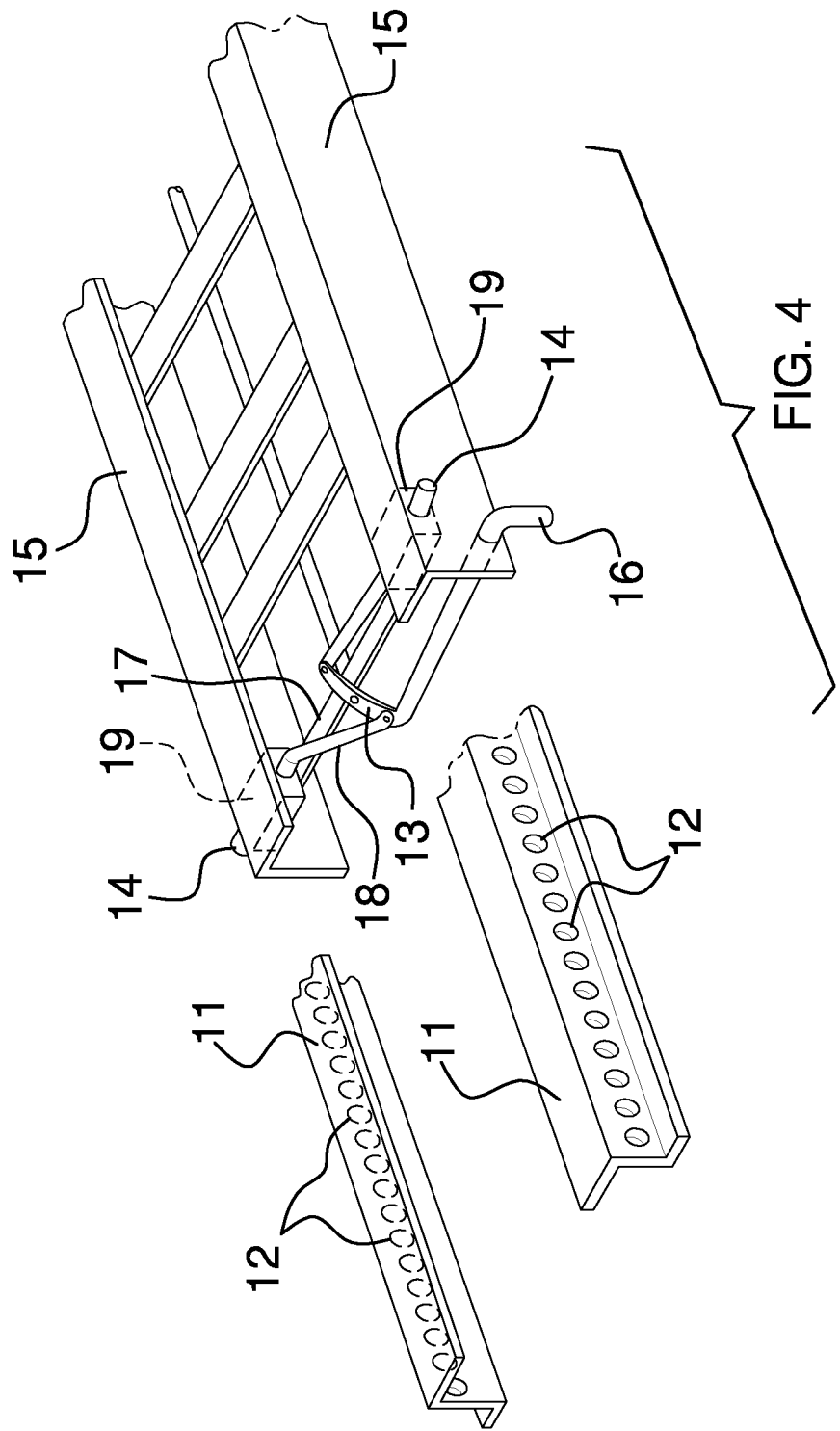

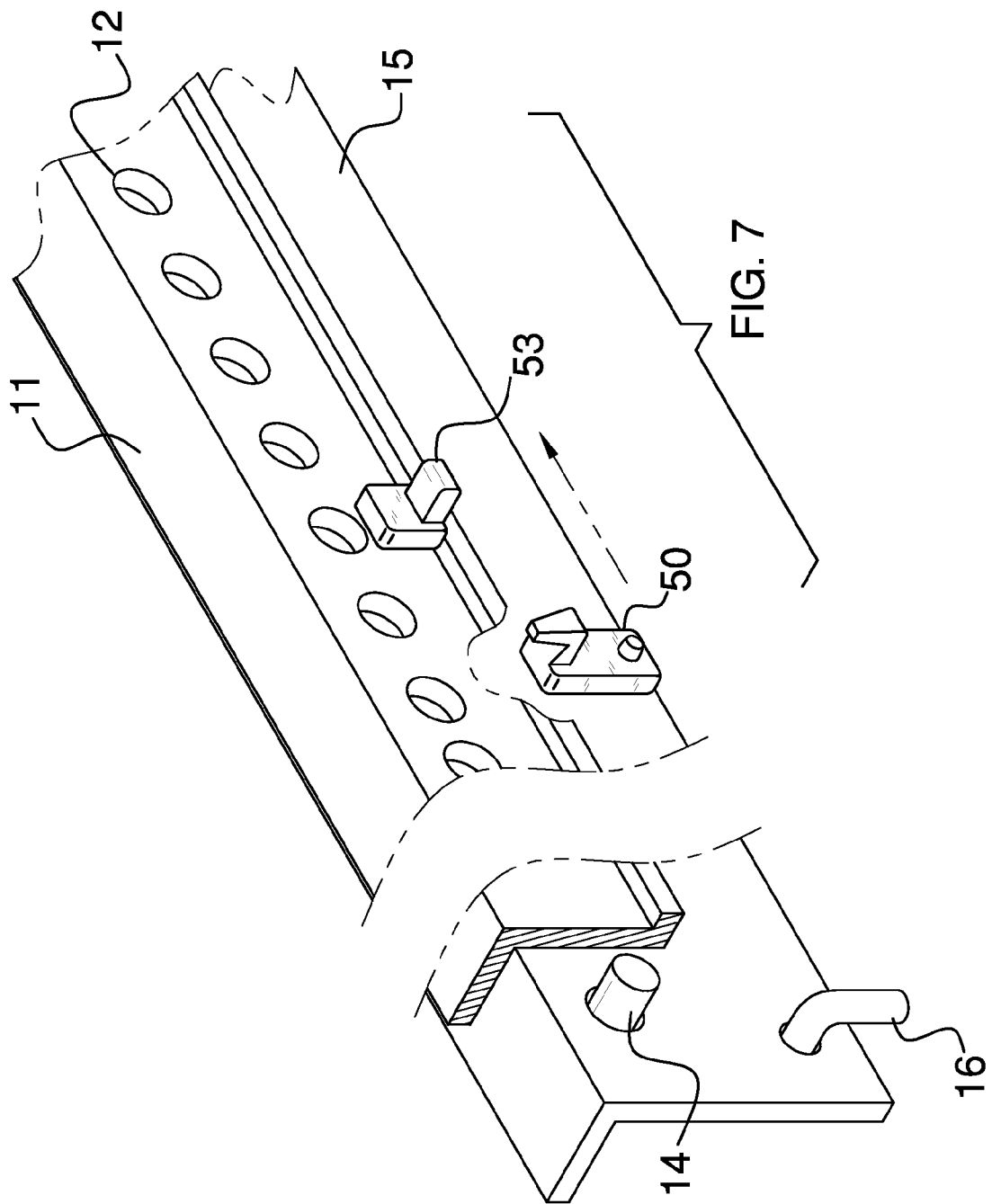

TRAILER AXLE ADJUSTMENT SENSOR AND INDICATION SYSTEM AND METHOD

CROSS REFERENCE

This application claims priority to U.S. provisional application Ser. No. 61/258,179, filed Nov. 4, 2009, the specification of which is incorporated herein by reference in its entirety.

BACKGROUND OF THE INVENTION

The weight of a trailer is of crucial importance in the trucking industry. Weight information is used to optimize the load at or near the vehicle's maximum capacity and to make sure that the load is evenly distributed across the vehicle axles. Even weight distribution is a major concern for public safety and highway maintenance because overloading a commercial vehicle is hazardous, reducing the truck's stability and braking ability. An overloaded commercial vehicle also causes significantly greater wear to public highways and to the vehicle itself. Therefore, Governments regulate vehicle weight by specifying a maximum legal load limit. Governments also regulate the distances between the axles requiring truck operations to take those distances into account depending on their routing through different states or countries. Another complication is that pick-up and delivery of cargo requires that the trailer height be aligned with the cargo dock of a facility where the truck will load or unload cargo from the trailer. The height of the trailer can be adjusted by sliding the rear axle group back and forth. Once the cargo is loaded or unloaded, the axle group must be moved back to the legal length before the trailer can travel the roads.

The axle groups on a trailer typically include one or more axle mounted on a suspension slider so they can be moved back and forth. By moving the suspension slider back and forth the cargo weight can be distributed between the axle group(s) on the trailer and the tractor so no one axle will be over the limit. When the trailer suspension slider is moved forward (closer to the tractor) the weight is shifted from the tractor to the trailer (the trailer axle load weight becomes heavier and the tractor axle weight becomes lighter). When the trailer suspension is moved back (away form the tractor) the weight is shifted from the trailer to the tractor (the trailer axle load weight becomes lighter and the tractor axle weight becomes heavier). The truck driver may move the suspension back and forth multiple times during a route as the trailer is loaded and unloaded to comply with legal distance requirements for the separation of the axles as the truck travels from state to state and country to country.

Moving the suspension slider for the axle group back and forth to get it to the desired position is a process that requires trial and error. It typically involves several steps and considerable time to get it right. First the operator parks the tractor and trailer brakes and putting blocks in place to ensure that trailer axle group does not move during the process. Then she/he goes to the back of the trailer suspension and releases the lock/latch pins that maintain the trailer body position along a set of rails on the axle frame. Sometimes these pins become bound by the weight of the suspension and are difficult to release manually. This may require the driver to rock the trailer to disengage them. The driver must then go back into the cab, move the tractor forward or backward so the suspension slider on the trailer is in the desired position. If everything is not lined up, the operator goes back to the cab and tries again until she/he is successful. Once lined up, the operator then attempts to re-lock the pins, which could again require locking the tractor. After the desired position of the suspension is attained, the driver must go back, physically lock the pins and visually inspect the suspension.

The position of the slider is chosen from guidelines and the driver's experience based on the load and the positioning of the load so that weight is evenly distributed and distances between the axles are legally compliant. Sometimes the judgment of the driver may prove to be incorrect which could result in overweight of one axle group over another.

To simplify the process of adjusting the trailer body to the desired position on the axle frame, a device is needed that indicates to the operator when the trailer body has reached the desired pin position during the operation of sliding the trailer body along the rails on the trailer frame.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a portable adjustment sensor for aligning a trailer body with a trailer frame. In some embodiments, the portable adjustment sensor comprises a first component 50 temporarily affixed to one of either a rail 11 or trailer frame 15 at a desired point. In some embodiments, the first component 50 comprises a magnet sensor 100, a first microprocessor 102, a transmitter 104, and a first power source 52. See FIG. 5A, FIG. 5B and FIG. 6. In some embodiments, the magnet sensor is operatively connected to the first microprocessor 102, and the microprocessor 102 is operatively connected to the transmitter 104, and the first power source 52 is operatively connected to the magnet sensor 100, the first microprocessor 102, and the transmitter 104. The portable adjustment sensor further comprises a second component 53 that is temporarily affixed to the other of either a rail 11 or a trailer frame 15 at a desired alignment point wherein the second component 53 comprises a magnet 110. The portable adjustment sensor may also comprise an alert mechanism 55 which has a receiver 200, a second microprocessor 202, an alert component 204, and a second power source 252. The receiver 200 is operatively connected to the second microprocessor 202, and the second microprocessor 202 is operatively connected to the alert component 204, wherein the second power source 252 is operatively connected to the receiver 200, the second microprocessor 202 and the alert component 204. In some embodiments, when magnet 110 of the second component 53 is within a sensing range of the magnet sensor 100, the magnet sensor 100 detects the magnet 110 and sends a first signal to the first microprocessor 102, the first microprocessor 102 is configured to trigger the transmitter 104 to send a second signal to the receiver 200 of the second component 53, upon receiving the second signal the receiver 200 sends a third signal to the second microprocessor 202, the second processor 202 is configured to activate the alert component 204 when it receives the third signal. The alert component 204 can emit an audio alarm (e.g., a buzzer sound) and/or a visual alarm (e.g., red light). Accordingly, the alert component may comprise a speaker and or a light bulb.

In some embodiments, the magnet sensor 100 may be a "hall effect sensor" that can detect presence of a magnet within a certain range. In some embodiments, the magnet sensor 100 is configured to detect a magnet 110 that is within less than 1.5 inch of each other, for example within 1.0 inch or less. In some embodiments, the magnet sensor 100 is configured to detect a magnet 110 that is within less than 1.0 inch of each other, for example within 0.5 inch or less.

In some embodiments, the first microprocessor 102 may be replaced by a first circuit board, wherein the first circuit board can receive a signal from the magnet sensor and then the first circuit board causes the transmitter 104 to send out a signal to be received by the receiver 200. In some embodiments, the second microprocessor may be replaced by a second circuit board, wherein the second circuit board receives a signal from the receiver and then the second circuit board sends a signal to the alert component to emit an audio and/or visual alarm. In some embodiments, the term "first microprocessor" may be used interchangeably with the term "first circuit board". In some embodiments, the term "second microprocessor" may be used interchangeably with the term "second circuit board".

BRIEF DESCRIPTION OF THE DRAWINGS

FIG. 4 is a three dimensional view of a locking pin system for use on a trailer.

FIG. 7 is a three dimensional view of first and second components of a sensor and indicator mounted to the frame and rails of the locking pin system.

DESCRIPTION OF PREFERRED EMBODIMENTS

Figure 1:
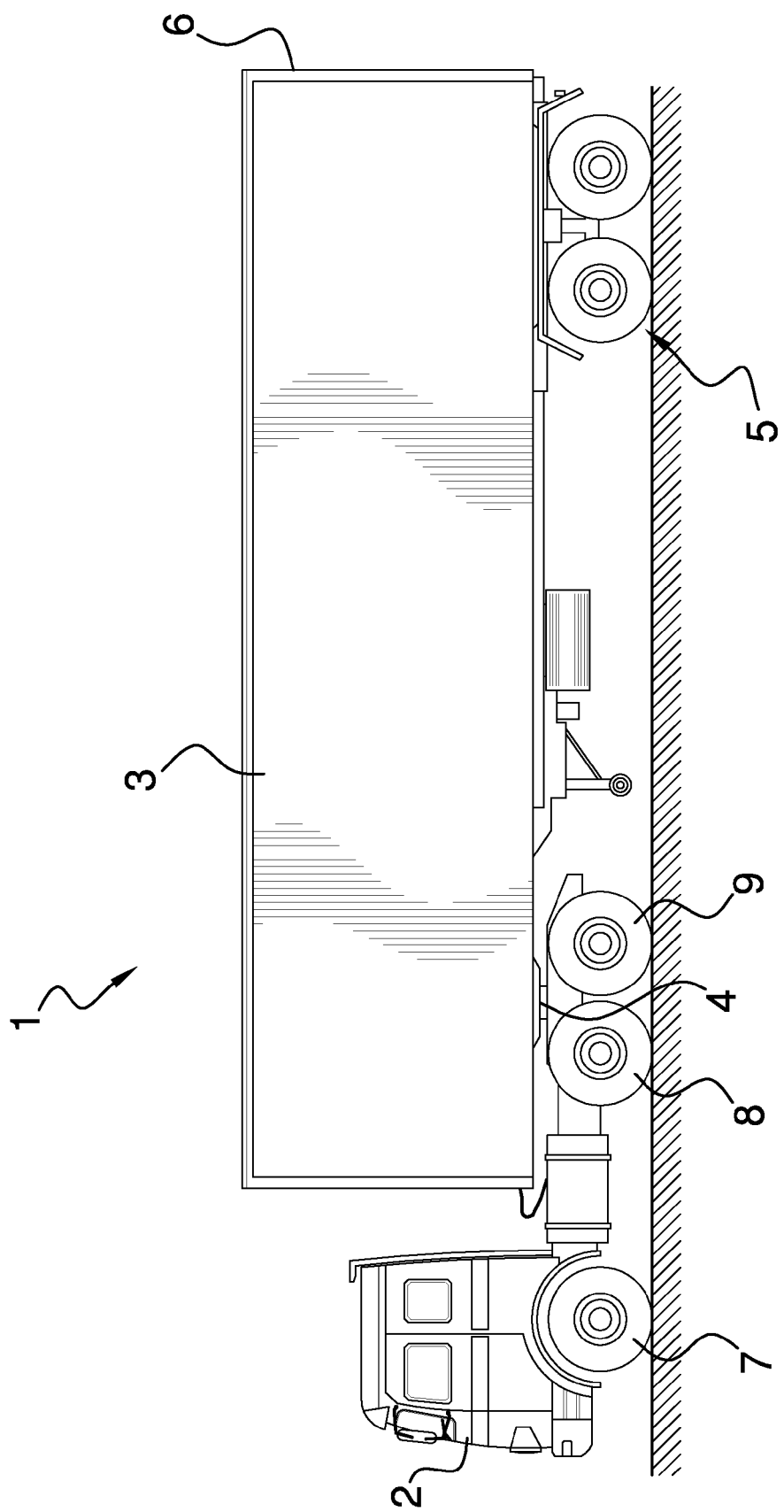
FIG. 1 is a side view of a tractor and trailer combination.

Referring now to FIGS. 1-7, the present invention features a trailer axle adjustment indication system and method is used in a tractor trailer combination for hauling cargo. FIG. 1 illustrates a tractor trailer combination 1. A truck or tractor portion 2 pulls a trailer 3 holding cargo. Tractor 2 is equipped with an engine, a cab compartment where the driver operates tractor 2. The rear axles 5 on trailer 3 are shown as a tandem axle arrangement. Other arrangements and numbers of axle groups can be used with the present invention provided at least one axle group on trailer 3 is adjustable forward or back. The rear axles 5 on trailer 3 can be adjusted forward and back relative to the rear 6 of trailer 3. The front and rear axles 7, 8, 9 of tractor 2 are fixed. Trailer 3 is connected to Tractor 2 at fifth wheel 4 through use of a kingpin (not shown).

Figure 2:
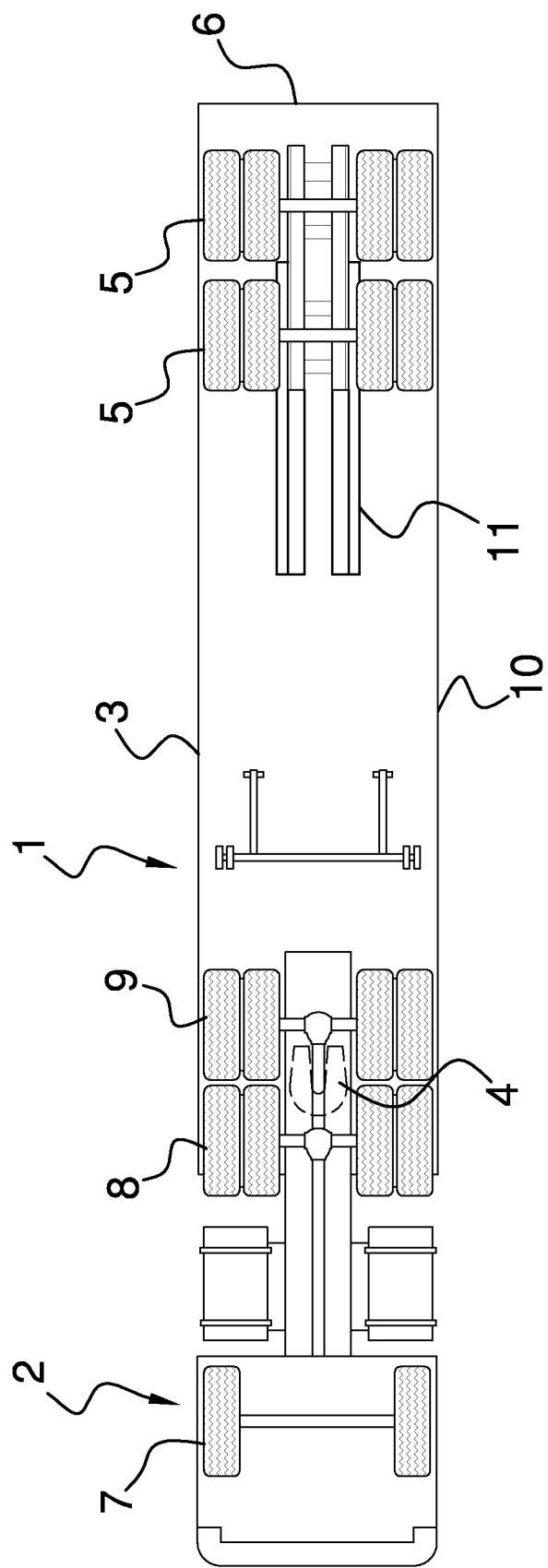
FIG. 2 is a schematic bottom plan view of the tractor and trailer of FIG. 1 showing the axle group.
Figure 3A:
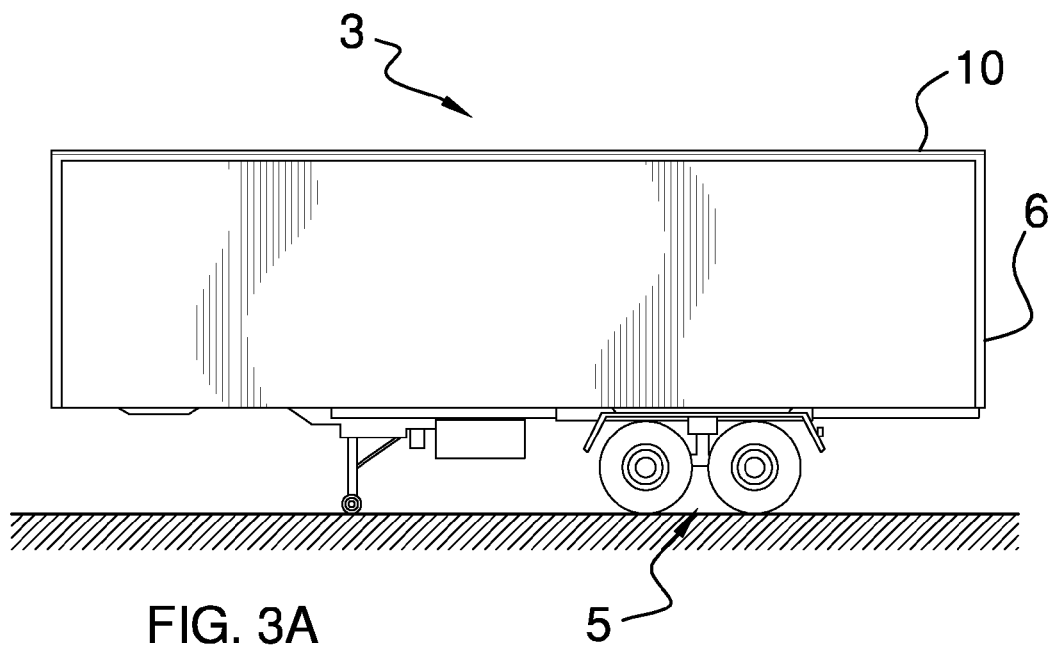
FIGS. 3A and 3B are side views of two trailers whose vehicle trailer axle frames are in different positions.
Figure 3B:
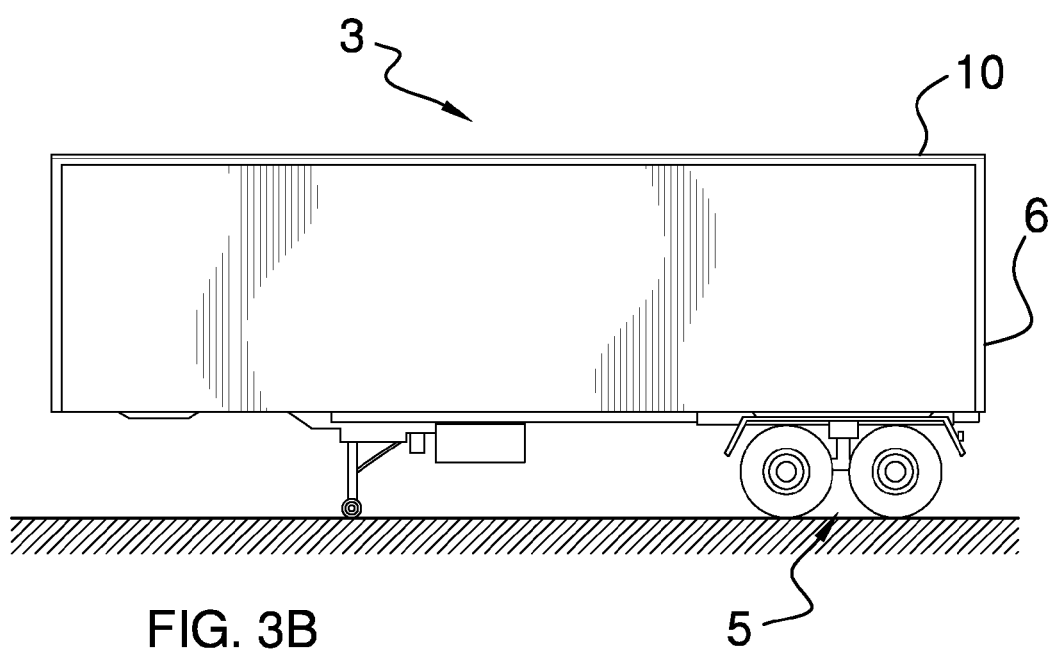

FIG. 2 shows a bottom view of tractor and trailer combination 1. By moving rear axles 5 back and forth, the cargo weight can be distributed between rear axle group 5 of trailer 3 and rear axles 8, 9, of tractor 2 so no one axle will be over the prescribed weight limit. When rear axle group 5 on trailer 3 are moved forward (closer to the tractor) the weight is shifted from tractor 2 to trailer 3 (the trailer axle load weight becomes heavier and the tractor axle weight becomes lighter). When rear axle 5 of trailer 3 are moved backward (away from the tractor) the weight is shifted from trailer 3 to tractor 2 (the trailer axle load weight becomes lighter and the tractor axle weight becomes heavier). Trailer body 10 is slidably connected to the rear axle group frame along a pair of rails 11 residing at the top of trailer frame. Rear axle group 5 can be adjusted to a number of positions along rails 11. For example, FIG. 3 illustrates 2 such positions. In the first position shown on the left side of FIG. 3, rear axle group 5 is shown in a forward position on rails 11 relative to the second position shown on the right side of FIG. 3 where rear axle group 5 is shown at the most rearward position of rails 11.

FIG. 4 illustrates a locking pin system for use on trailer 3 along the length of rails 11. Along the vertical portion of each rails 11 is a set of locking pin holes 12 through which a locking pin mechanism 13 causes locking pins 14 to be inserted when in the locked position. Repositioning of the locking pins 14 is achieved by the rails 11 and a complementary frame portion 15 attached to the trailer body (not shown) cooperating with locking pin mechanism 13, which aligns locking pins 14 and locking pin holes 12. For the sake of clarity, rails 11 are shown in FIG. 4 as being separated from the complementary frame portion 15, but in operation trailer body 10 mounted on complementary frame portion 15 slidably contacts rails 11 to permit adjustment of the position of trailer body 10 relative to rear axle group 5 and rails 11 that are part of the frame of rear axle group 5.

A locking pin mechanism 13 is illustrated in FIG. 4, where the locking pins 14 are extended in a pin-engaged position. A handle 16 is used to engage/disengage the locking pins 14. When an operator pushes the handle 16 toward the complementary frame portion 15, the handle arm (whose movement rotates the shaft of locking pin mechanism 13) pivots. The handle 16 is supported by cross member 17. Also, the pin arms 18 are pushed, which causes their respective locking pins 14 to extend out of their respective locking pin boxes 19, thus extending the locking pins 14 through locking pin holes 12 (i.e., engagement). In disengagement of locking pins 14, handle 16 is forced away from complementary frame portion 15, thus reversing the above stated motions that engage locking pin s 14. More than one set of locking pins can be configured in the system to reduce the likelihood of the trailer body 10 disconnecting from rails 11 and rear axle group 15.

Adjusting rear axle group 5 to achieve appropriate weight balancing, length restrictions and/or trailer height requires several steps. First the operator parks the tractor trailer combination 1 applying the trailer brakes and blocking the wheels on rear axle group 5. Then the driver goes to the back of the trailer suspension and releases locking pins 14. Sometimes these pins are bound by the weight of the suspension and are difficult to release manually. This may require the driver to have to rock the trailer to disengage them. The driver must then go back into the cab, move the tractor forward or backward so trailer body 10 slides along rails 11 until she/he has a feeling that she/he is in the desired position. The operator then exits tractor 2 to re-lock the pins. However, if she/he finds that locking pins 14 are not aligned with holes 12, the driver must go back and move tractor 2 again. This process is repeated until locking pins 14 are holes 12 are properly aligned. The operator then re-locks pin 14, which could again require rocking tractor to get them to penetrate holes 12. All of this is carried out many times along a travel route and may occur in inclement weather further complicating the tedious process.

To reduce the effort on the part of the driver to align locking pins 14 with holes 12, the present invention is a small, portable device that adjusts a trailer axle using a sensor and indication system and method that alert the driver to the proper distance of rear axle group 5 in relation to the kingpin. This is accomplished by aligning locking pins 14 with particular corresponding holes 12. The portable device can be used on any trailer configured with the slidable rail system described above for connecting a trailer body 10 to a set of rails 11 that is part of the frame of an axle group 5. The invention comprises two components. The first component is temporarily attached to rails 11 while the second component is attached to complementary frame portion 15. Attachment of the two components to rails 11 and complementary frame portion is accomplished through the use of any temporary attachment mechanism such as a clamp, tape, hook and loop adhesive, magnets, etc.

In operation, first component 50 has a proximity sensor that detects the presence of the second component 53 prompting an alert to be signaled through an alert mechanism. The alert notifies the operator when second component 53 is in range of first component 50. The alert can be a light, a sound, a vibration or any other sensory perceptible notification informing the operator that there is alignment between locking pins 14 and holes 12. In one embodiment, a light on the side of the first component is illuminated so that the operator can see it from the cab. Alternatively, the first component can include a speaker that beeps or provides another notification sound. In another alternative embodiments, first component 50 can transmit a signal to a remote device using known wireless technology or through a wired auxiliary component to cause a vibration of an auxiliary unit used by the operator. A light or a sound warning can similarly be used with a wired or wireless auxiliary unit.

Figure 5A:
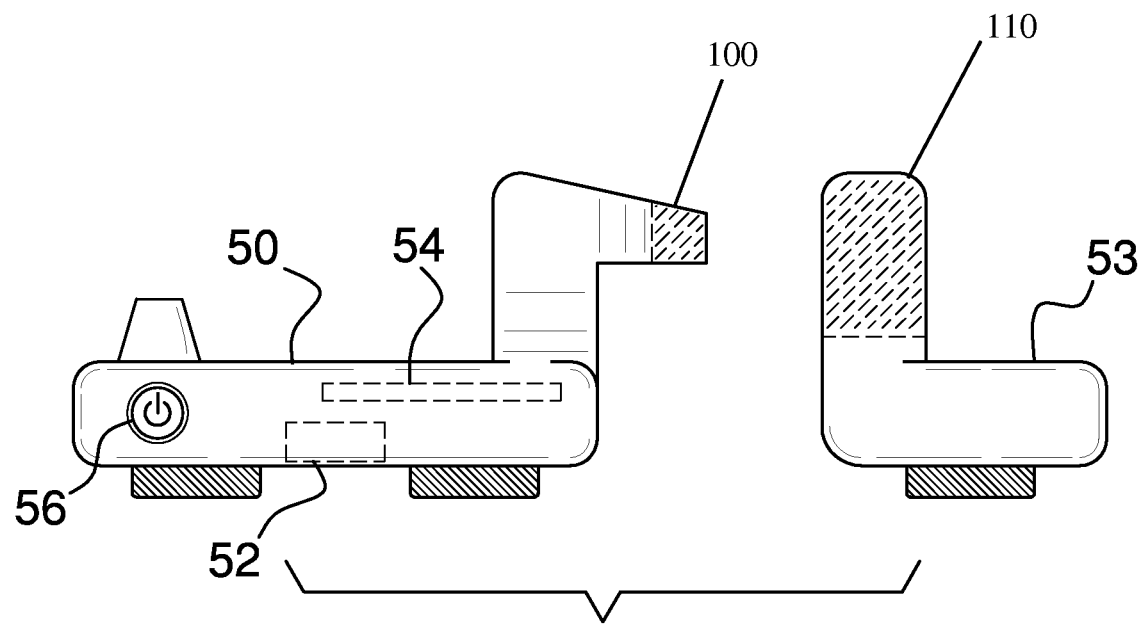
FIGS. 5A and 5B show a first component 50, second component 53 and alert mechanism 55. The magnet sensor 100 of the first component 50 can detect the presence of a magnet 110 disposed on the second component 53.
Figure 5B:
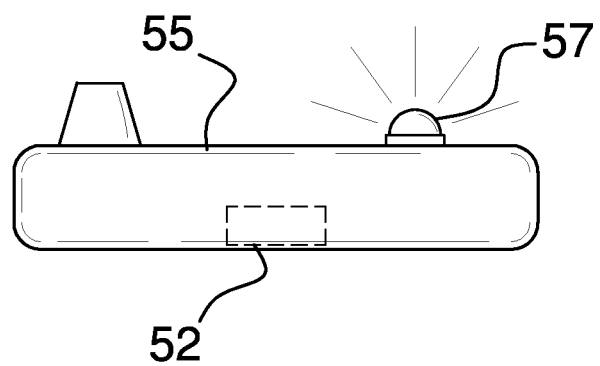

In one embodiment of the invention, first component 50 includes an electric circuit completer 54 connected in a circuit with an alert mechanism 55 that is completed upon detection of the magnet that forms second component 53. An embodiment of the first component 50 is shown in FIG. 5. First component 50 has a casing 51 in the shape of a rectangular box that includes an external surface that may be temporarily attached to one of the rails 11. Casing may be formed of plastic or another weather resistant material that can be attached to the underside of a trailer 3 along rails 11. Inside of casing 51 is a circuit including a battery 52 (e.g., power source) for powering first component 50. Battery 52 may be a 9 volt battery or a similarly small power source designed to turn on a small light, activate a small speaker or cause first component to send a signal to an auxiliary unit that houses a light, a speaker, a vibrator or another form of signaling to the operator. Connected serially in the circuit is (a) alert mechanism 55, which is shown as a speaker but could alternatively or supplementally be a light 57 or another alert mechanism, (b) an electric circuit completer 54; and an activation switch 56 with an on and off position. When in the on position, the activation switch 56 closes the circuit and causes power to flow from battery 52, to electric circuit completer 54. When circuit completer 54 comes into range of second component 53 shown in FIG. 6, which may be a magnet or another device (e.g., a contact switch, a light sensor, etc.) that has been temporarily attached along complementary frame portion 15 of trailer body 10 in line with rails 11 at the desired connection point, that causes electric circuit completer 54 to close completing the circuit and powering alert mechanism 55. FIG. 7 shows a first component 50 and a second component 53 attached respectively to rails 11 and complementary frame portion 15 so that as trailer body 10 slides along rails 11 by moving tractor 2 with trailer wheels immobilized, first component 50 and second component 53 will come in contact at the desired point where they have been fixed. When alignment occurs, the alert mechanism is powered and a signal (e.g., a light, a sound, a vibration, etc.) is provided to the operator that locking pins 14 are aligned with holes 12. The operator then applies the brakes to tractor 2 to stop trailer body in position.

She/he then gets out of the tractor 2 and locks locking pins 14 to secure trailer body 10 to rear axle group 5 at the desired position. The invention removes the guesswork from aligning locking pins 14 with holes 12 so that the operator does not have to get in and out of tractor 2 multiple times.

Figure 6:
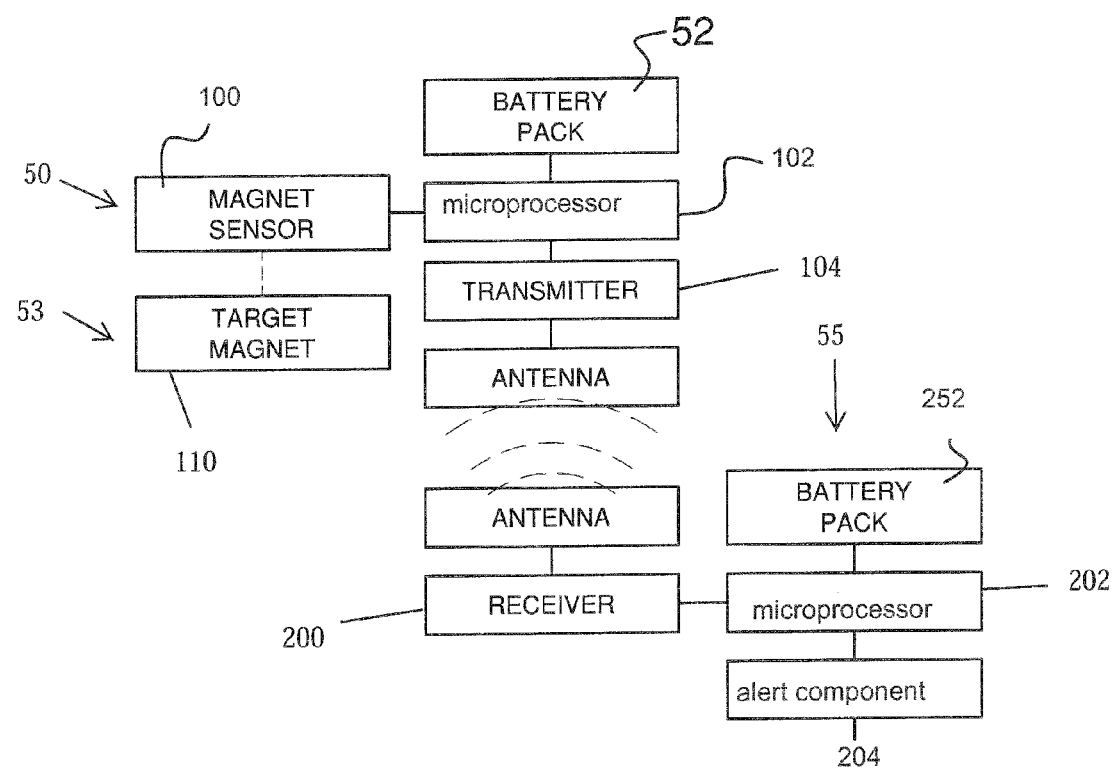
FIG. 6 is a schematic diagram of the communication between the components. Upon detection of a magnet 110 by a magnet detector 100 of the first component 50, the first component 50 transmits a signal to the alert mechanism.

It is to be understood that the above description and drawings are only for illustrating limited variations of the present invention and are not intended to limit the scope of the invention. Specific dimensions, directions or other physical characteristics relating to the embodiments disclosed are not to be considered as limiting, unless the claims expressly state otherwise. In particular, FIGS. 5-7 show a trailer axle adjustment indication system and method in which the invention may be used. However, it should be understood that the invention may also be implemented in other configurations to accomplish the same purpose. For example, while the description states that first component 50 is attached to the rails 11 and second component 53 is attached to complementary frame portion 15, the two components can be reversed without impacting the intended functionality, which is to alert the tractor operator when the pins and holes for latching a trailer from to a trailer body are aligned as desired and in position to be locked.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. For example, an apparatus or device of a multitude of detection devices such as magnetic to be used on a trailer or to detect the distance of the rear axle in relation to the kingpin, so that a modified version of this present invention ("Light-spike sensor") located in the driving cab of a truck can be initiated "turned on", indicating more than one distance reading, such as by use of digital number readouts or other means of indications. Such apparatus or device can be made and constructed from any use of any materials as known to one of ordinary skill in the art, barring the use of hazardous material. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:
1. A portable adjustment sensor for aligning a trailer body with a trailer frame, comprising:
  (a) a first component temporarily affixed to one of either a rail or trailer frame at a desired point, the first component comprising:
    (i) a magnet sensor;
    (ii) a first microprocessor;
    (iii) a transmitter;
    (iv) a first power source;
  wherein the magnet sensor is operatively connected to the first microprocessor, and the microprocessor is operatively connected to the transmitter; and the first power source is operatively connected to the magnet sensor, the first microprocessor, and the transmitter;

(b) second component that is temporarily affixed to another of either a rail or a trailer frame at a desired alignment point, the second component comprising a magnet;
(c) an alert mechanism comprising:
   (i) a receiver;
   (ii) a second microprocessor;
   (iii) an alert component;
   (iv) a second power source;
wherein the receiver is operatively connected to the second microprocessor, and the second microprocessor is operatively connected to the alert component, wherein the second power source is operatively connected to the receiver, the second microprocessor and the alert component;
wherein when magnet of the second component is within a sensing range of the magnet sensor, the magnet sensor detects the magnet and sends a first signal to the first microprocessor, the first microprocessor is configured to trigger the transmitter to send a second signal to the receiver of the second component, upon receiving the second signal the receiver sends a third signal to the second microprocessor, the second processor is configured to activate the alert component when the second processor receives the third signal.

2. A portable adjustment sensor for aligning a trailer body with trailer frame, comprising:
(a) a first component temporarily affixed to one of either a rail or a trailer frame at a desired aligned point, the first component comprising:
   (i) a housing; and
   (ii) a circuit including: a switch for activating and deactivating the first component; an alert mechanism for alerting an operator; a power source for supplying power to the first component; and a circuit completer;
(b) a second component that is temporarily affixed to another of either a rail or a trailer frame at a desired alignment point that causes the circuit completer to close a circuit in the first component when the first component is within a sensing range of the second component; and
wherein when the circuit is closed, the alert mechanism is activated thereby notifying an operator that the trailer body and the trailer frame are aligned at a desired length.

3. The portable adjustment sensor of claim 1 wherein the alert mechanism is a speaker.

4. The portable adjustment sensor of claim 1 wherein the alert mechanism is a light.

5. The portable adjustment sensor of claim 1 wherein the second component is a magnet.

6. A portable adjustment sensor for aligning a trailer body with trailer frame, comprising:
(a) a first component temporarily affixed to one of either a rail or a trailer frame at a desired aligned point, the first component comprising:
   (i) a housing; and
   (ii) a circuit including: a switch for activating and deactivating the first component; a power source for supplying power to the first component; a circuit completer; and a first communication component;
(b) a second component that is temporarily affixed to another of either a rail or a trailer frame at a desired alignment point that causes the circuit completer to close a circuit in the first component when the first component is within a sensing range of the second component;
(c) an auxiliary component that is remote from the first component including: an alert mechanism for alerting an operator; a second communication component that receives a signal from the first communication component when the circuit is closed activating the alert mechanism to notify an operator that the trailer body and the trailer frame are aligned at a desired length.

7. The portable adjustment sensor of claim 5 wherein the alert mechanism is a speaker.

8. The portable adjustment sensor of claim 5 wherein the alert mechanism is a light.

9. The portable adjustment sensor of claim 5 wherein the second component is a magnet.

* * * * *